United States Patent [19]
Birnholz et al.

[11] Patent Number: 6,103,375
[45] Date of Patent: Aug. 15, 2000

[54] BINDER FOR ADHERING AND ENCAPSULATING OPTICAL FIBERS

[75] Inventors: Hellena Birnholz; Alisa Buchman, both of Haifa, Israel

[73] Assignee: State of Israel, Ministry of Defense Arnaments Development Authority, Rafael, Haifa, Israel

[21] Appl. No.: 09/057,288

[22] Filed: Apr. 8, 1998

[30] Foreign Application Priority Data

Apr. 9, 1997 [IL] Israel ............................... 120646

[51] Int. Cl.$^7$ ........................................ B32B 9/04
[52] U.S. Cl. .................... 428/391; 525/403; 525/476; 525/903
[58] Field of Search ................. 525/903, 403, 525/476; 428/391

[56] References Cited

U.S. PATENT DOCUMENTS 4,250,074  2/1981  Foscante et al. ..................... 523/428
5,532,320  7/1996  Tripathy et al. ..................... 525/100

FOREIGN PATENT DOCUMENTS 0 627 380 A1  12/1994  European Pat. Off. .
92130         1/1995   Israel .

*Primary Examiner*—Robert Dawson
*Assistant Examiner*—Jeffry B. Robertson
*Attorney, Agent, or Firm*—Akin, Gump, Strauss, Hauer & Feld, L.L.P.

[57] ABSTRACT

An adhesive binder for optical fiber packages is described which comprises a silicone-epoxy IPN (Interpenetrating Polymer Network), with the epoxy cured to give reinforcing domains within the cured silicone. The adhesive binder is prepared by cross-linking and polymerizing a silicone polymer and an epoxy resin, with a cross-linking agent and a catalyst for curing the epoxy and silicone, optionally with the addition of a silane wetting agent, such as methacryloxypropyl trimethoxysilane. In preparing a wound optical fiber package, the adhesive binder is applied in solution to the fiber, during its winding, by passing the fiber through the solution or by brushing the solution on each layer when its winding is completed.

15 Claims, 3 Drawing Sheets

BINDER FOR ADHERING AND ENCAPSULATING OPTICAL FIBERS

FIELD OF THE INVENTION

This invention relates to improving optical fiber windings by the application of a novel adhesive binder, particularly as to their stability and payout properties, to said novel adhesive binder and to the improved packages thus obtained.

BACKGROUND OF THE INVENTION

It is well known in the art that a binder, generally an adhesive, may be used to stabilize filamentary structure packages such as metal wire coils, electrical cable packages, etc. In some applications, which require payout of the wound filament from the package, the adhesive is used not only to stabilize the package, but also to control the fluent payout of the filament, and to protect the filament for long life durability. An example of such an application is an optical fiber dispenser at the tail of a guided missile, in which optical fiber conveys navigation signals to the missile, or an optical fiber dispenser which is used in a similar way, but conveys optical signals between the target and the control station.

Optical fiber packages, particularly canisters, viz. assemblies of a bobbin and superimposed layers of fibers wound thereon, are usually obtained by winding.

In order to stabilize the canisters, an adhesive binder is usually applied to the fiber or to each fiber layer. The binder usually has adhesive properties, which are useful for such a purpose. However, the binder must also contribute to solving other problems encountered in preparing and using optical fiber canisters. Some such problems refer to the winding operation, including winding faults, small gaps, voids and the like.

However, particularly serious problems are met with when the fiber has to be unwound or paid out from the canister. When the fiber is unwound, it is found that prior art adhesives adhere to the fiber too strongly, or in fragments. This causes increased wind resistance or local impacts when the fiber is deployed, thus creating a corresponding tension or bending in the fiber, which might cause stress concentration and possible breakages thereof, which means a total failure of the system. Furthermore, an incompatible adhesive binder may cause damages to the fiber during storage and payout, causing increased optical loss in the fiber, or causing damage such as crazing due to stress corrosion.

It may be said that contradictory properties are required from an optical fiber adhesive binder. On one hand it must have sufficient adhesive strength and durability to hold the fiber in place during long storage without maintenance, flight and unwinding operation. On the other hand, it must not interfere with the fiber unwinding and, while holding the fiber layers in place, must allow the fiber to be paid out from the package easily and regularly.

Several polymers are known in the prior art as adhesive binders for optical fiber packages. A different adhesive composition is described in Israeli Patent 92130, which comprises 5% of an adhesive consisting of one-fourth of 3,3,3-trifluoropropylmethylsiloxane and three-fourths of a polydimethylsiloxane, and 95% of a carrier which is a trichlorotrifluoroethane or a trichloroethane or a mixture thereof.

It is a purpose of this invention to eliminate the drawbacks of the prior art optical fiber adhesive binders.

It is another purpose of this invention to provide an adhesive binder which permits to carry out the payout of optical fiber canisters at high speed.

It is a further purpose of this invention to provide an adhesive binder which can be applied either continuously to the optical fiber or to the fiber layers during the winding operation.

It is a still further purpose of this invention to provide an adhesive binder that is particularly adapted for the winding and payout of optical fibers on and from canisters for guided objects, such as missiles, etc.

Other purposes and advantages of the invention will appear as the description proceeds.

SUMMARY OF THE INVENTION

The invention provides an adhesive binder for optical fiber packages, which is characterized in that it comprises a polymer which is a silicone-epoxy IPN (Interpenetrating Polymer Network), with the epoxy cured to give reinforcing domains within the cured silicone.

The resin is prepared from components which consist essentially of two parts: "Part A", which is a blend of a silicone polymer and epoxy resin, and "Part B", which consists of three components: catalyst for the silicone, epoxy curing agent and wetting agent for adhesion improvement. A methacrylic silane wetting agent is added to the said components and the whole mixture is dissolved in a solvent.

The aforesaid resin components—parts A and B—are available on the market and designated together as RTV 13-116, manufactured by Insulcast, a division of American Safety Technology, Inc., U.S.A. The silane wetting agent added is a 3-methacryloxypropyl trimethoxysilane.

The solvent is any organic solvent that does not damage the fiber coating. It is preferably chosen from among toluene, methylethyl ketone, isopropyl alcohol, or a mixture of them.

According to the manufacture data sheet a weight ratio of 10:1 (A:B) should be used. According to this invention, however, an excess of Part B is preferably used, in order to accelerate the reaction rate in the diluted solution. The A:B ratio is comprised between 10:1 and 10:3.

The invention may be used for winding optical fibers into a package. The components of the adhesive binder are mixed with one another and with a solvent, hereinbefore defined, to form a solution having a concentration of said components from 6.25 to 12.50 wt % and preferably from 6.66 to 10.07 wt %; applying to said fiber, during its winding, an effective amount of said solution by a method chosen from among passing the fiber through said solution, or brushing or spraying said solution on each layer when its winding is completed; and curing the adhesive binder components at 25–28° C. for 24 hours and then at 35–40° C. for another 24 hours.

DETAILED DESCRIPTION OF THE PREFERRED EMBODIMENTS

Figure 1:
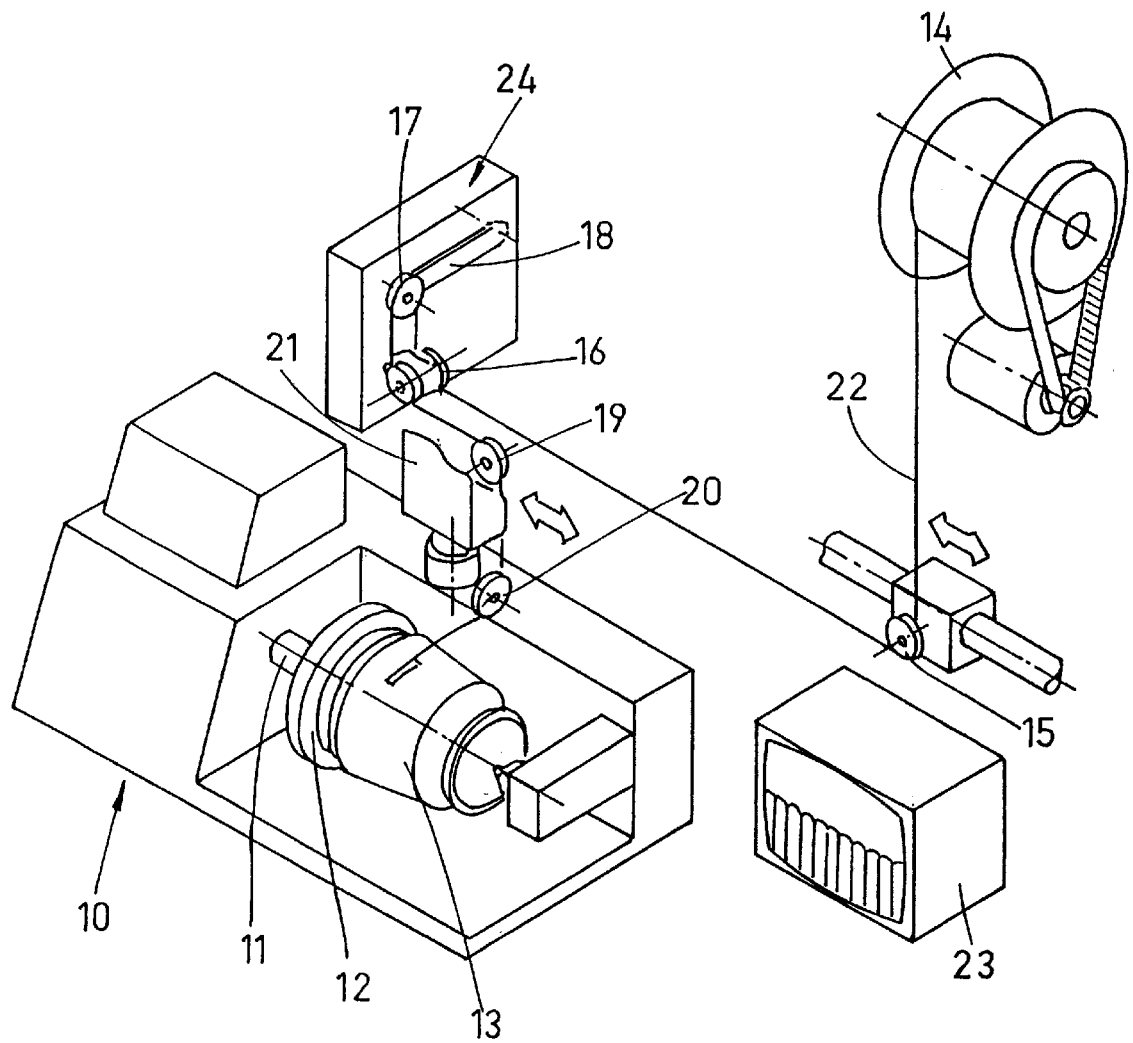
FIG. 1 schematically illustrates apparatus for winding optical fibers onto a bobbin to produce a canister.

FIG. 1 schematically illustrates an apparatus for winding an optical fiber on a bobbin to produce a canister. The winding machine, indicated generally at 10, has a shaft 11 and means, not shown, for rotating said shaft. A bobbin 12 is mounted on the shaft and optical fiber 22 is wound thereon to produce a winding 13, the assembly of bobbin 12 and winding 13 constituting the canister. To carry out the winding, the optical fiber is unwound from a supply package 14, passes over thread guide 15 and subsequently over tension control device 24, which comprises guide rollers 16, tension rollers 17 and tensioning arm 18, and then over guide rollers 19 and 20, which guide it in front of a video camera, schematically indicated at 21, from guide roller 20 onto bobbin 12. Numeral 23 indicates a TV set on which one can view the images obtained from the video camera 21.

Figure 2:
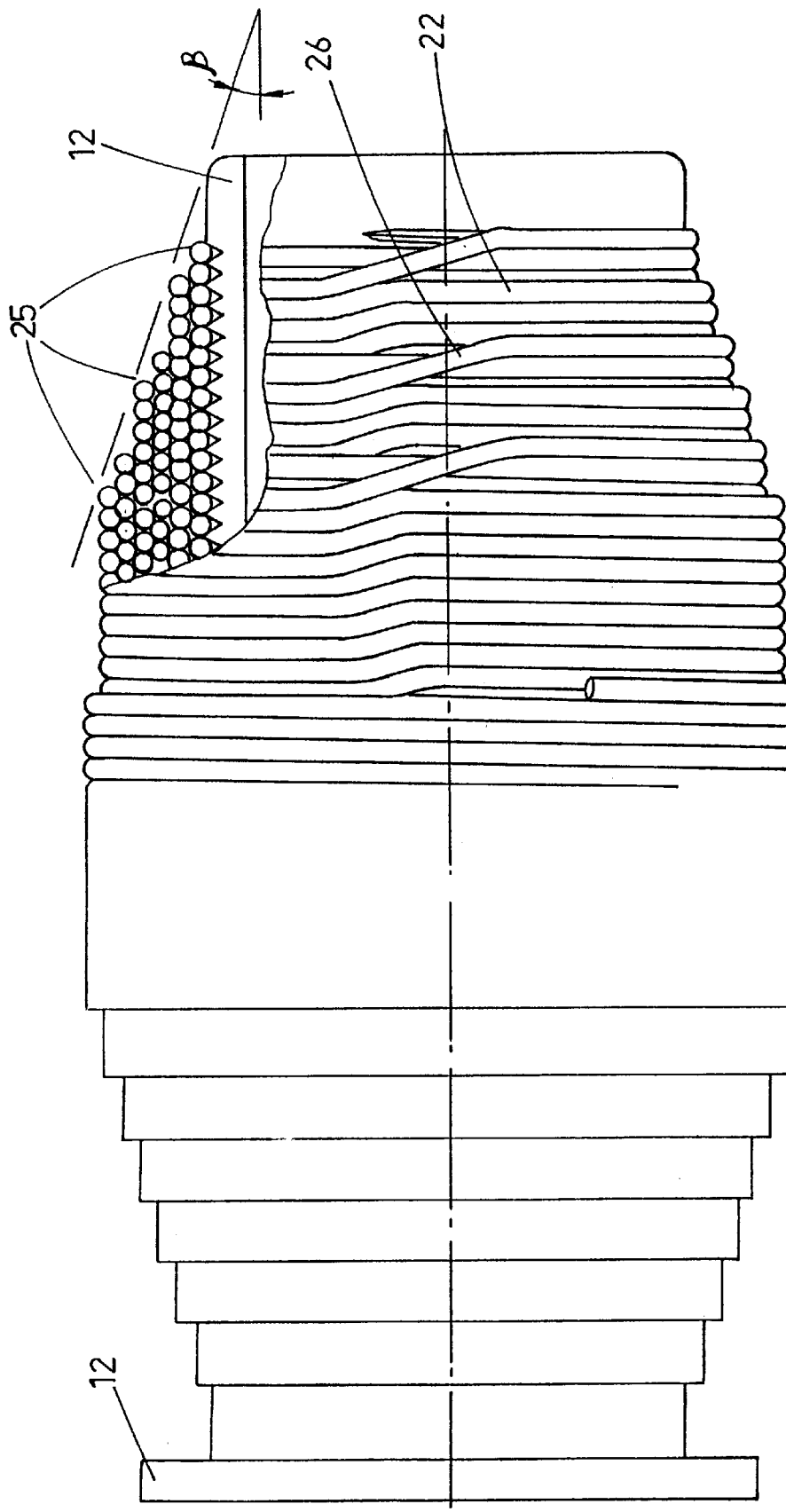
FIG. 2 schematically illustrates a phase of said winding.

An example of a conical package is illustrated in FIG. 2. 12 is once again the bobbin, and 13 generally indicates the winding. The winding shown here is constituted by superimposed layers, indicated at 25. Each layer 25 is slightly shorter than the layer on which it is superimposed, as clearly seen in the drawing, thereby conferring to the winding two conical portions at the ends thereof, the angle of the cone surface to the direction of the bobbin axis being indicated by β. This structure of winding, however, is only an example, and other windings, e.g. but not only an orthocyclic winding, can be made by the application of the adhesive binder according to the invention. The optical fiber 22 is guided longitudinally of the bobbin by the thread guides 19 and 20, shown in FIG. 1. When it comes to the end of a winding layer, the motion of the thread guides is reversed, and the fiber is guided longitudinally of the bobbin in the opposite direction. At the moment the longitudinal displacement of the bobbin is reversed, viz. when a winding layer has been completed, the fiber crosses over the end of said layer, as shown, for instance, at 26 in FIG. 2, skipping a number of fibers thereof, to start the next layer at a small distance from the end of the completed layer, as shown in FIG. 2. One of the functions of the adhesive binder applied to the package is to permit said package to acquire and maintain the shape illustrated in FIG. 2, and in particular, to maintain the staggered ends of the successively superimposed fiber layers, without causing the fiber to become snagged or partially unraveled or anyway to loose the regular winding structure that has been illustrated.

Figure 3:
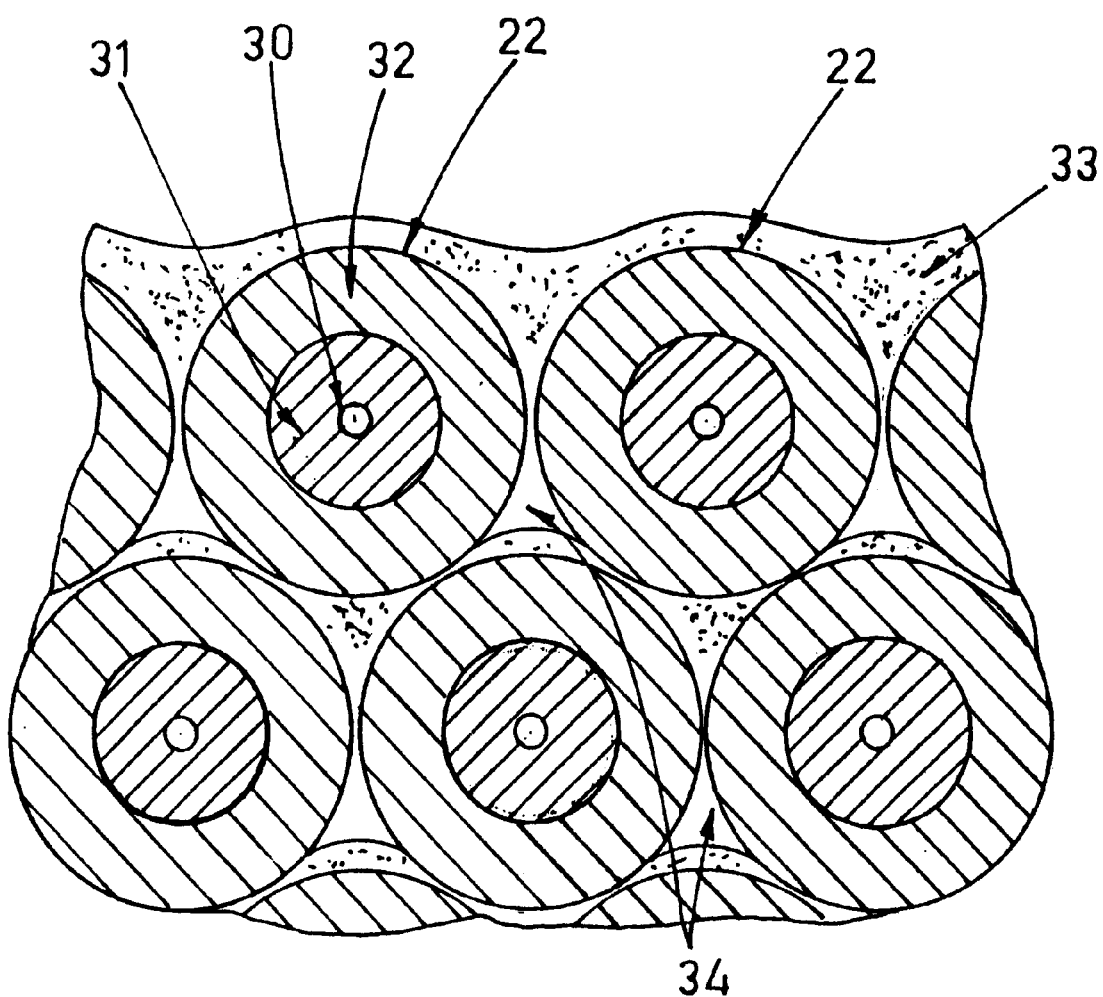
FIG. 3 schematically illustrates a cross-section of a wound package.

FIG. 3 schematically illustrates in cross-section a portion of a complete winding. The fiber 22 comprises, as it commonly does, a core 30 and a cladding 31, the core being of silica and the cladding of a silica different from that of core 30 by having a different refractive index. The silica (core+cladding) is coated with a polymeric protective coating (single or multiple) 32, protecting the fiber optic from environmental effects, and relieving stresses. The package adhesive binder is illustrated at 33, and may cover the fibers not entirely, but present discontinuities or voids, such as 34. As has been said, the adhesive binder may be applied either continuously to the fiber during the winding operation, by causing said fiber to pass through a solution containing the adhesive binder substance, or it may be applied onto each layer of the winding when it has been completed. The means for applying the adhesive binder are not shown in FIG. 1. They may be brushing, spraying or evaporating.

The adhesive binder used according to the invention is of a kind known as IPN (Interpenetrating Polymer Network). As hereinbefore stated, it comprises two components, the first one being a mixture of two components—a silicone polymer and an epoxy resin—and the second, comprising the catalyst for the silicone, a curing agent for the epoxy and a silane wetting agent. The two polymer components of silicone and epoxy cure to produce an IPN of silicone-epoxy.

Further, a methacrylic silane wetting agent is added to the mixture of the aforesaid two components, as an additional wetting agent. The entire mixture is diluted with a solvent.

The proportions of the aforesaid components are as follows: in part A, from 4.76 to 11.25%, and preferably from 5.28 to 8.23% of the solution. Part B comprises between 1.12 and 1.42%, and preferably from 1.32 to 1.66% of the solution for the polymerization, and 0.061 to 0.123% and preferably from 0.066 to 0.099% of the solution is a wetting agent. All the percentages in this specification are by weight, unless otherwise specified.

The above adhesive binder composition is dissolved, for application, in a solvent which is compatible with the fiber optic coating. A suitable solvent will lead to a clear solution with the adhesive binder without phase separation. Examples thereof are toluene, methylethyl ketone and isopropyl alcohol, and mixtures thereof. The concentration of the adhesive binder composition in the solvent is from 6.25 to 12.50%, and preferably from 6.66 to 10.07%. Examples of adhesive binder compositions according to the invention are given hereinafter.

Table I lists a number of different compositions of the adhesive binder.

TABLE

|  | 1 | 2 | 3 | 4 |
| --- | --- | --- | --- | --- |
| 13-116 (A) | 4.76 | 5.28 | 8.32 | 11.25 |
| 13-116 (B) | 1.428 | 1.32 | 1.66 | 1.125 |
| silane | 0.061 | 0.066 | 0.099 | 0.123 |
| solvent | 93.75 | 93.33 | 89.92 | 87.50 |
| Adhesive (A + B + silane) | 6.25 | 6.66 | 10.07 | 12.50 |

The physical characteristics of the cured adhesive binder, after its polymerization, are important and concur in characterizing the binder. Thus, the glass transition temperature (Tg) should not be within the working temperature range, and preferably should be below −40° C. and/or above 80° C. The thermal coefficient of linear expansion should be in the same magnitude range as that of the optical fiber.

The mechanical properties of the polymerized adhesive binder are also important.

Tensile tests on the cured resins of Table I were carried out on dumbell (dog bone) samples. The samples were prepared from the bulk adhesive—not from the adhesive solution—viz. the solvent was not added to the compositions of table I. The mechanical tests were performed at three temperatures: 25° C., −20° C. and +55° C. The results obtained are as follows:

Tensile strength—range between 2–7 MPa.

Elongation—30–150%.

Modulus—3–15 MPa.

The viscosity of the solutions of the adhesive binder is in the range of 5–50 cps for appropriate application to the optical fibers.

The application of the adhesive binder according to the invention permits payout of fiber optic canisters at high speed, without damaging the fiber, or other drawbacks. Speeds above 100 meters per second can be achieved in a wide range of temperatures, e.g., −20° C. to 55° C. in various environments. The stability of the dimensions of the coated package are also important: no dimensional changes are observed in the wound bobbins as a result of the application of the invention.

The adhesive binder of the invention can be applied in regular or continuous winding process. In regular winding, the adhesive binder is applied to each layer after it is wound. In continuous winding, the adhesive binder is applied directly by leading the fiber through a bath containing the adhesive binder before it is wound.

An example of the application of the invention will now be given.

The optic fibers used were fibers produced by either Corning (MC, SMF-28™) or by Optical Fibers (SM-02-R), and others.

The canisters were an aluminium or a composite canister, produced by RAFAEL Armament Development Authority, described in European Patent Application No. 94201504.1.

The adhesive binder was applied in both regular and continuous process.

The polymerization was carried out for all cases firstly at 25–28° C. for 24 hours and then at 35–40° C. for another 24 hours.

The thermal cycling test was as follows: 1 hour at 71° C., then 8 hours at −20° C. and finally 1 hour at 71° C.

The packages were then paid out at speeds of 170 and 200 m/sec, at −15° C., 25° C. and at 55° C. The payout was smooth and regular and the optical properties of the fibers were completely retained.

While examples of the invention have been given by way of illustration, it will be apparent that many modifications, variations and adaptations may be made therein by persons skilled in the art, without departing from the spirit of the invention or exceeding the scope of the claims.

We claim:

1. An adhesive binder for optical fiber packages, comprising a polymer which is a silicone-epoxy interpenetrating polymer network, with the epoxy cured to give reinforcing domains within the cured silicone, wherein said polymer is the product of the polymerization of a silicone and an epoxy resin, a curing agent, a catalyst and a wetting agent.

2. Adhesive binder according to claim 1, further comprising an additional silane wetting agent added to the mixture of components.

3. Adhesive binder according to claim 2, wherein all of the components are dissolved in a solvent.

4. Adhesive binder according to claim 2, wherein the additional silane is a 3-methacryloxypropyl trimethoxysilane.

5. Adhesive binder according to claim 3, wherein the solvent is chosen from among toluene, methylethyl ketone, isopropyl alcohol and mixtures of them.

6. Adhesive binder according to claim 1, wherein the weight ratio of the blend of the silicone polymer and the epoxy resin to the curing agent, the catalyst and the wetting agent is comprised between 10:1 and 10:3.

7. Adhesive binder according to claim 3, wherein the concentration of binder components in the solution is from 6.25 to 12.50 wt %.

8. Adhesive binder according to claim 7, wherein the concentration of binder components in the solution is from 6.66 to 10.07 wt %.

9. Method of preparing a wound optical fiber package, comprising the steps of applying to the fiber, during its winding, an adhesive binder solution according to claim 3.

10. Method according to claim 9, wherein the binder solution is applied by a method chosen from among: passing the fiber through said solution, or brushing, spraying or evaporating said solution on each layer when its winding is completed.

11. Method according to claim 9, further comprising curing the adhesive binder components at 25–28° C. for 24 hours and then at 35–40° C. for another 24 hours.

12. Method according to claim 10, further comprising curing the adhesive binder components at 25–28° C. for 24 hours and then at 35–40° C. for another 24 hours.

13. An adhesive binder according to claim 1, wherein the epoxy is cured at 25–28° C. for 24 hours and at 35–40° C. for an additional 24 hours.

14. An optical fiber package comprising an optical fiber and an adhesive binder, said adhesive binder comprising a polymer which is a silicone-epoxy interpenetrating polymer network, with the epoxy cured to give reinforcing domains within the cured silicone.

15. The optical fiber package according to claim 14, wherein the adhesive binder has a glass transition temperature below about −40° C. or above about 80° C. and a coefficient of thermal expansion of about the same magnitude as that of the optical fiber.

* * * * *